R. E. PIERCE.
PLANTER ATTACHMENT FOR CULTIVATORS.
APPLICATION FILED OCT. 13, 1915.
1,171,239.
Patented Feb. 8, 1916.
2 SHEETS—SHEET 1.
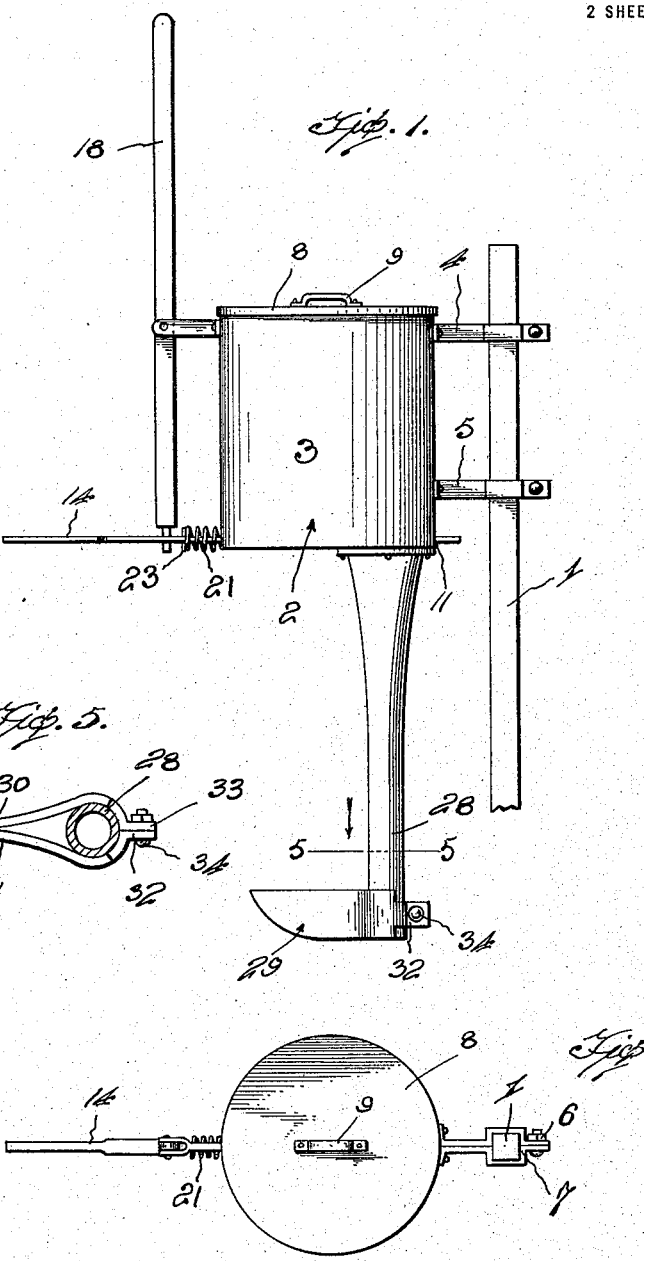

R. E. PIERCE.
PLANTER ATTACHMENT FOR CULTIVATORS.
APPLICATION FILED OCT. 13, 1915.
1,171,239.
Patented Feb. 8, 1916.
2 SHEETS—SHEET 2.
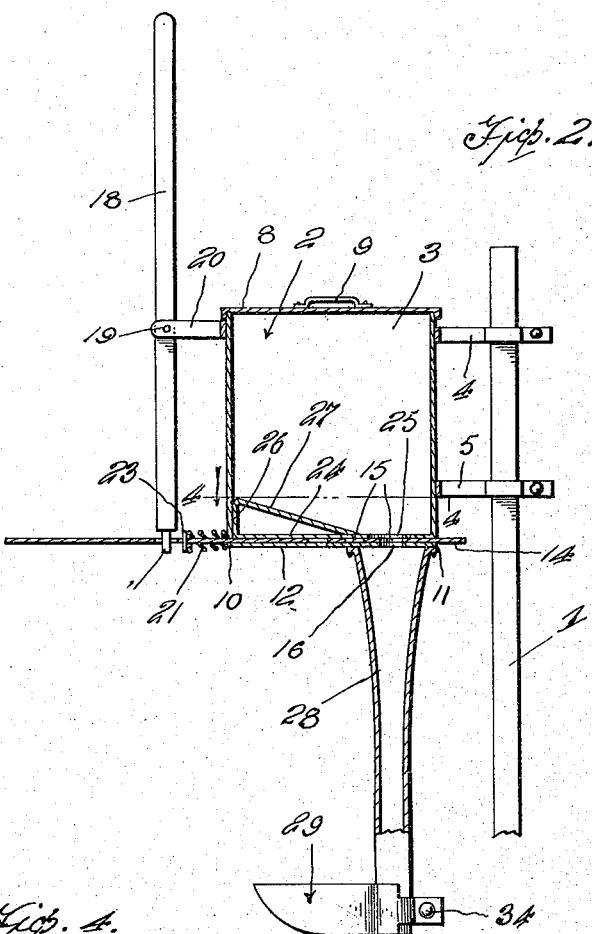
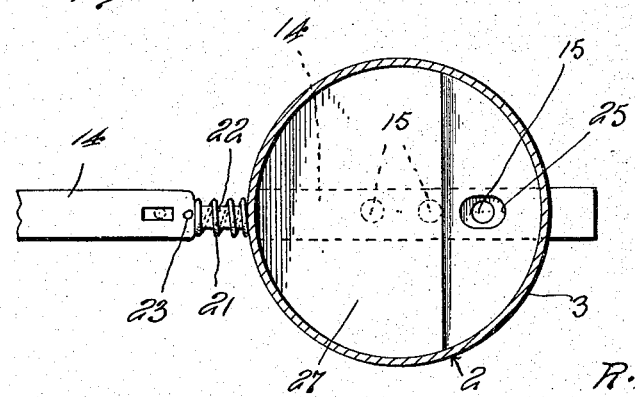

UNITED STATES PATENT OFFICE.

ROLDON E. PIERCE, OF BRIMFIELD, ILLINOIS.

PLANTER ATTACHMENT FOR CULTIVATORS.

1,171,239.     Specification of Letters Patent.     Patented Feb. 8, 1916.

Application filed October 13, 1915. Serial No. 55,677.

*To all whom it may concern:*

Be it known that I, ROLDON E. PIERCE, a citizen of the United States, residing at Brimfield, in the county of Peoria and State of Illinois, have invented certain new and useful Improvements in Planter Attachments for Cultivators; and I do hereby declare the following to be a full, clear, and exact description of the invention, such as will enable others skilled in the art to which it appertains to make and use the same.

This invention relates to a planter attachment for cultivators, and the primary object of the invention is to provide a planting attachment for use upon ordinary cultivators, such as are used for the purpose of the cultivation of corn or like grain, so that the corn may be re-planted, or so that corn may be planted in hills wherein the original planting of the corn failed to grow, making a uniform field and eliminating the bare hills or spaces throughout the field, which are occasioned by the failure of the first seeds or grain to grow.

Another object of this invention is to provide an attachment as specified, which includes a hopper, having a grain guiding spout connected to the lower end of the same, which projects downwardly and has a furrow opening shoe attached to the lower delivery end of the same, and to mount means within the hopper, controlled by the hand operated lever, for controlling the dropping of the seed out of the hopper and through the planting or delivery spout.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved planter attachment, Fig. 2 is a vertical section through the planter attachment, Fig. 3 is a plan view of the attachment, Fig. 4 is a cross sectional view on the line 4—4 of Fig. 2, and Fig. 5 is a sectional view on the line 5—5 of Fig. 1.

Referring more particularly to the drawings, 1 designates an ordinary cultivator standard, which carries the shovel or plow of an ordinary cultivato tivation of corn or the li tachment, which is gene the numeral 2, includes has metallic straps 4 an The metallic straps 4 a the standard 1, and ar by set screws 6 which outwardly extending en bars which compose each The hopper 3 has a mounted upon its uppe which cover the hoppe grain to be planted. tached to the upper sur for facilitating the rem the same from or upon hopper 3 is provided wi 11 formed in its sides a the bottom 12 of the sa 10 and 11 are positione each other, and the seed extend slidably through seed dropping plate 14 plurality of openings 15 for alinement with the formed in the bottom 12. plate 14 extends out of the hopper 3 and has a pivotally supported leve nected thereto. The l supported at 19, by an cured to and extends forward side of the ho lever 18 is provided fo 14 longitudinally, upon ment of the lever by spiral spring 21 is coil section 22 of the plates 1 spring engages the oute per 3, while the other en der formed by reducing pin 23 which extends th A plate 24 is mounte 3 and it is provided witl ing 25, which alines w and is adapted for aline openings 15. The plate upper surface of the bc per for forming a gu movement of the seed The plate 24 is bent up at 26, and downwardly shown at 27, forming ar guiding the grain into insuring its passage tl 25, 15 and 16 into the delivery spout 28 of the planter. The delivery spout 28 of the planter is attached to the bottom of the hopper 3 in any desired manner, and extends downwardly therefrom for depositing the grain in a furrow formed by a furrow opening shoe 29 that is detachably supported by the lower end of the delivery spout 28. The furrow opener 29 is composed of either a plate or a pair of plates of sheet metal, which have their forward ends positioned in facial abutting engagement with each other, and secured together for forming a relatively narrow blade. The plates 30 and 31, of which the shoe 29 is formed, diverge as they extend rearwardly, and they have their rear portions curved for fitting the outer surface of the lower end of the spout 28. Tangentially extending flanges 32 and 33 are formed upon the plates 30 and 31 and they are clamped together by a bolt 34, which also clamps the plate upon the lower end of the delivery spout 28.

In the operation of the improved planter attachment for cultivators, the planter attachment 2 is attached to an ordinary cultivator standard 1 by the straps 4 and 5, as has been heretofore described, and when a blank hill is reached during the first cultivation or plowing of the corn or grain, the hand lever 18 is moved upon its pivotal support, which will slide the seed dropping plates 14 longitudinally within the bottom of the hopper 3, and permit a small number of the grains of corn or other seed to fall through the openings 25, 15 and 16, and the delivery spout 28, into the furrow which is made by the furrow opening shoe 29. Owing to the fact that the standard of a cultivator is positioned so that it will travel along side of a row of growing grain, the furrow which is formed by the furrow opening shoe 29, will not disrupt or uproot any of the growing grain.

From the foregoing description taken in connection with the accompanying drawings the advantages of construction and of the method of operation of the improved planter attachment for cultivators will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a planter attachment for cultivators, the combination, of a hopper, means carried by said hopper for detachably connecting the hopper to an ordinary cultivating shovel carrying standard, a delivery spout carried by said hopper, the sides of said hopper being positioned with a pair of alining openings positioned a short distance above the bottom of the hopper, a seed dropping plate slidably extending through said openings, a lever pivotally supported by said hopper and operatively connected to said seed dropping plate for moving the seed dropping plate for permitting of the passage of seeds out of said hopper through said delivery spout, means attached to said seed dropping plate for automatically returning it to a non-seed dropping position, a plate positioned within said hopper and above the upper surface of said seed dropping plate, said last named plate being bent upwardly and inwardly and downwardly at an incline, providing an inclined surface for guiding the grain toward the outlet opening formed in said seed dropping plate.

In testimony whereof I affix my signature in presence of two witnesses:

ROLDON E. PIERCE.

Witnesses:
SAM HOWARD,
FRANK E. CARSON.